(12) United States Patent
Siller et al.

(10) Patent No.: US 9,663,003 B2
(45) Date of Patent: May 30, 2017

(54) METHOD FOR MANUFACTURING AN ADJUSTMENT FITTING

(75) Inventors: Juergen Siller, Roedental (DE); Frieder Krueger, Coburg (DE); André Blinzler, Grub am Forst (DE); Stephanie Hartleb, Weidhausen (DE); Matthias Weiss, Roedental (DE); Michael Zellmann, Bischberg (DE); Volker Moeller, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 936 days.

(21) Appl. No.: 12/966,964

(22) Filed: Dec. 13, 2010

(65) Prior Publication Data

US 2011/0154925 A1    Jun. 30, 2011

Related U.S. Application Data

(63) Continuation of application No. PCT/EP2009/004085, filed on Jun. 6, 2009.

(30) Foreign Application Priority Data

Jun. 13, 2008    (DE) .................... 10 2008 028 088

(51) Int. Cl.
*B60N 2/22* (2006.01)
*B60N 2/225* (2006.01)

(52) U.S. Cl.
CPC ........ *B60N 2/2252* (2013.01); *B60N 2205/20* (2013.01); *Y10T 29/4978* (2015.01); *Y10T 74/19647* (2015.01)

(58) Field of Classification Search
USPC ..................... 74/413, 569, 60; 297/362, 367
See application file for complete search history.

(56) References Cited

U.S. PATENT DOCUMENTS

| 4,407,544 A | * | 10/1983 | Bahring ........................ 297/362 |
| 5,524,970 A | * | 6/1996 | Kienke et al. ................ 297/362 |

(Continued)

FOREIGN PATENT DOCUMENTS

| DE | 29 21 588 A1 | 12/1980 |
| DE | 20 2005 014 192 U1 | 2/2007 |

(Continued)

*Primary Examiner* — William Kelleher
(74) *Attorney, Agent, or Firm* — Muncy, Geissler, Olds & Lowe, P.C.

(57) ABSTRACT

A method for producing an adjustment fitting, particularly for a vehicle seat is provided, whereby an outer wheel is associated with a first fitting part, the wheel having inner toothing, and having an inner wheel that can be associated with a second fitting part, the wheel having outer toothing, wherein the inner wheel having the outer toothing is inserted into the outer wheel having the inner toothing eccentrically to a rotational axis in the manner of a wobble mechanism, wherein partial eccentric elements are inserted rotatably with respect to each other in an eccentric receiving chamber formed between the rotational axis and the inner wheel so as to produce variable eccentricity, wherein a transmission element having an engagement element for actuating the partial eccentric element is inserted such that the engagement elements interacts with a catch of the partial eccentric element. In spite of the production tolerances of the components, overall higher quality and higher operational safety of the produced adjustment fitting are to be achieved. For this purpose, the geometry of the partial eccentric element is measured, and the geometry of the transmission element is individually adapted according to the data of the measurement before inserting the transmission element.

9 Claims, 4 Drawing Sheets

(56) References Cited

U.S. PATENT DOCUMENTS

| | | | |
|---|---|---|---|
| 7,278,689 B2* | 10/2007 | Guillouet | 297/362 |
| 7,281,765 B2* | 10/2007 | Scholz et al. | 297/362 |
| 7,461,900 B2* | 12/2008 | Lange | 297/367 R |
| 7,513,573 B2* | 4/2009 | Wahls et al. | 297/362 |
| 7,607,737 B2* | 10/2009 | Liebich et al. | 297/362 |
| 7,857,391 B2* | 12/2010 | Brehm et al. | 297/361.1 |
| 2011/0154925 A1* | 6/2011 | Siller et al. | 74/413 |

FOREIGN PATENT DOCUMENTS

| | | |
|---|---|---|
| DE | 20 2007 012 004 U1 | 8/2009 |
| WO | WO 2006/088896 A1 | 8/2006 |
| WO | WO 2006088896 A1 * | 8/2006 |

* cited by examiner

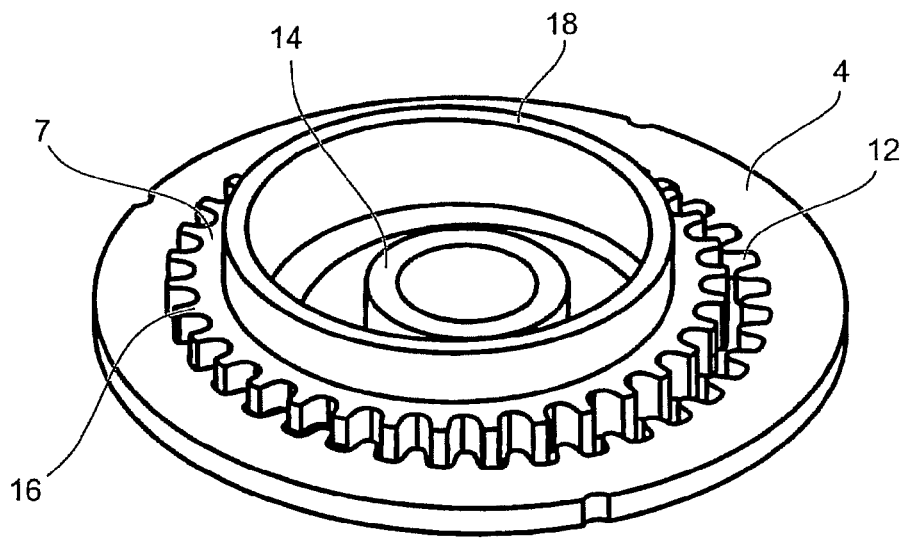
FIG. 4
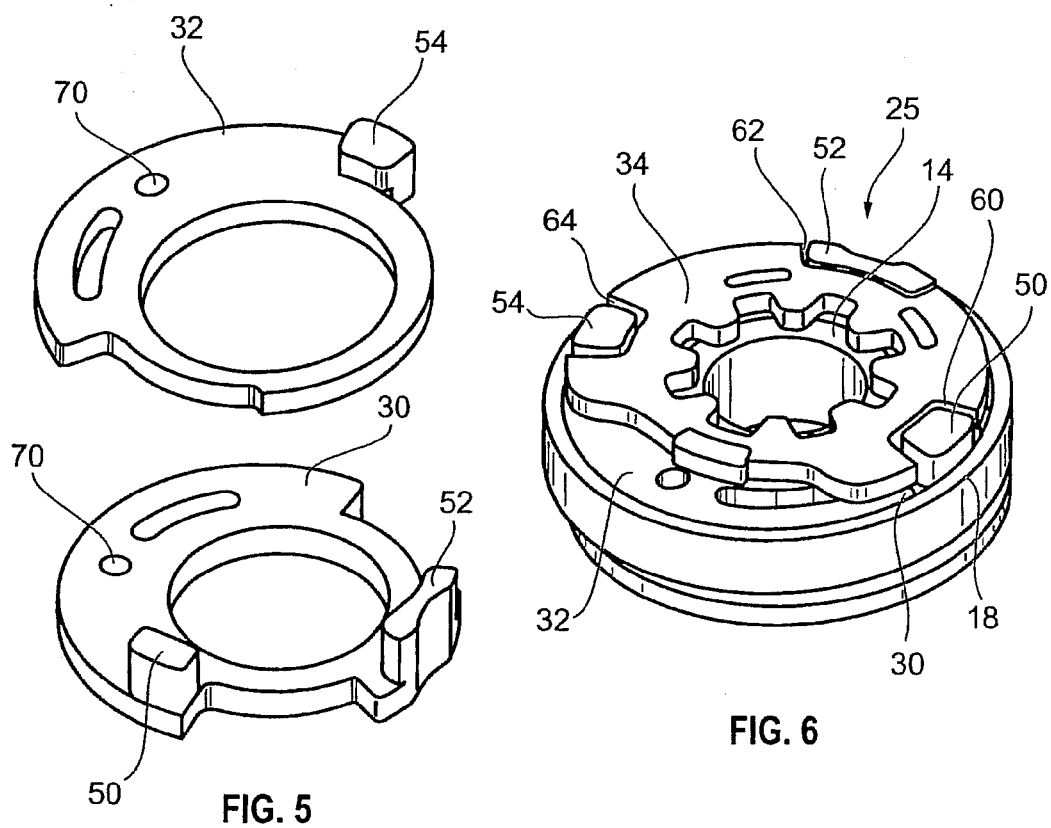
FIG. 5
FIG. 6

METHOD FOR MANUFACTURING AN ADJUSTMENT FITTING

This nonprovisional application is a continuation of International Application No. PCT/EP2009/004085, which was filed on Jun. 6, 2009, and which claims priority to German Patent Application No. DE 10 2008 028 088.7, which was filed in Germany on Jun. 13, 2008, and which are both herein incorporated by reference.

BACKGROUND OF THE INVENTION

Field of the Invention

The invention relates to a method for manufacturing an adjustment fitting, in particular for a motor vehicle seat, having an outer wheel with internal teeth that can be associated with a first fitting part, and having an inner wheel with external teeth that can be associated with a second fitting part, wherein the inner wheel with external teeth is inserted eccentrically to an axis of rotation, in the manner of a wobble mechanism, in the outer wheel with internal teeth, wherein eccentric cam parts forming a variable eccentricity are placed to be rotatable with respect to one another in an eccentric receiving space formed between the axis of rotation and the inner wheel, wherein a transmission element having engagement elements for actuating the eccentric cam parts is employed such that the engagement elements works together with carrier elements of the eccentric cam parts.

Description of the Background Art

An adjustment fitting of the aforementioned type is typically used for adjusting the backrest of a motor vehicle seat, in particular. To this end, the first fitting part is attached to the backrest and the second fitting part is attached to the seat base of the vehicle seat, for example. The use of a wobble mechanism has proven its value in this location, since it represents a rotary joint that requires comparatively few elements while simultaneously having a transmission.

An adjustment fitting of the aforementioned type is known, for example, from DE 29 21 588 A1, which corresponds to U.S. Pat. No. 4,407,544. The wobble mechanism in this design comprises an outer wheel with internal teeth that is rotatable about the axis of rotation, and an inner wheel with external teeth that is located eccentrically to the central axis in the interior of the outer wheel. The outer wheel and inner wheel here form an eccentric receiving space with regard to one another, in which space are located a first and a second eccentric cam part that are rotatable relative to one another, by which means a variable eccentricity is formed. A carrier plate that can be rotated by means of an adjusting shaft is provided for actuating the wobble mechanism. The carrier plate has recesses that stand in engagement with carrier pins located on the eccentric cam parts. In addition, a mechanically acting coupling element (for example a spring) is provided that, in the rest position of the adjustment fitting, rotates the eccentric cam parts relative to one another so that their overall eccentricity increases. By this means, the planetary wheel is brought into a position in which it engages the outer wheel without play. When the carrier plate is rotated, one eccentric cam part at a time is rotated by means of the carrier pin, reducing the overall eccentricity. By this means, the inner wheel is brought into a position in which it engages the outer wheel with play. The inner wheel can be rotated relative to the outer wheel in a wobbling manner with rotating eccentricity by means of the carrier plate. By this means the first fitting part rotates relative to the second fitting part with a corresponding transmission ratio that is determined by the ratio of the tooth count of the external teeth of the inner wheel to the tooth count of the internal teeth of the outer wheel.

For manufacturing reasons, the individual parts of the adjustment fitting always have deviations from the norm with respect to their geometric parameters. Certain manufacturing tolerances are thus always present in the individual parts. Actuation of the wobble mechanism by the carrier plate in the adjustment fitting described above is strongly dependent on component geometry, however. Consequently, even small tolerances in manufacture can result in the wobble mechanism or adjustment fitting having switchover clearance and loss angle.

Furthermore, the elements of the carrier plate and their control geometry are constructed to act on only one side. This means that in a design of the eccentric cam parts that is not self-locking, they may open under load. The limits within which the eccentricity is adjustable are in turn limited by the tolerances of the components. Accordingly, these manufacturing tolerances can result in a reduction in strength, excessive play under corresponding load, and non-uniform startup between the left and right adjustment fittings.

These problems have hitherto been dealt with through such measures as parts selection at assembly. This means that components that deviate similarly, as defined by the deviation of an individual part from the standard, and thus fit together better, are combined with one another to produce a wobble mechanism. For electrically driven adjustment fittings, an additional eccentric carrier ring that actuates the eccentric cam parts by friction is also sometimes included. These measures can merely reduce the above-described disadvantages resulting from manufacturing tolerances, but cannot eliminate them.

SUMMARY OF THE INVENTION

It is therefore an object of the invention to provide a method for manufacturing an adjustment fitting of the aforementioned type in which a higher overall quality and greater operational reliability of the manufactured adjustment fitting are achieved despite the manufacturing tolerances of the components.

In an embodiment, a measurement of the geometry of the eccentric cam parts can be made in the assembled state, and the geometry of the transmission element is individually matched based on the measurement data before insertion of the transmission element.

In this regard, the invention proceeds from the idea that a higher overall quality and greater operational reliability of the wobble mechanism and of the adjustment fitting could be achieved if the manufacturing tolerances that inevitably arise during the production process could be compensated for. Since reducing the manufacturing tolerances would mean an inordinately high expense in producing the individual components, such a reduction is not easy to achieve, however. Thus, since the manufacturing tolerances of the components cannot be eliminated, they should at least be taken into account in the further production process. In particular, the mechanical interaction between the eccentric cam parts and the transmission element for actuating the eccentric cam parts is especially sensitive to manufacturing tolerances of the components. For this reason, the manufacturing tolerances of these components in particular should be taken into account. In the production of the adjustment fitting, the two eccentric cam parts are first placed in the wobble mechanism, and the transmission element is then put on. Therefore, the geometric parameters of the eccentric cam parts should be measured during the production process, and the geometry of the transmission element should next be individually matched to these geometric parameters to compensate for the manufacturing tolerances.

In an embodiment of the method, the angle of rotation of the eccentric cam parts relative to one another is measured, in particular. The angle of rotation of the eccentric cam parts has a direct effect on the size of the range in which the overall eccentricity can be varied: To improve the operational reliability of the adjustment fitting, however, the variability of the eccentricity in particular should be identical in every wobble mechanism in order to ensure uniform start-up of the wobble mechanism, increase its strength, and minimize the play of the wobble mechanism.

The transmission element stands in mechanical contact with the eccentric cam parts via the engagement elements. In order to optimize the interaction between the eccentric cams and the transmission element, the geometric position and length of the engagement elements should therefore advantageously be matched.

In advantageous manner, indentations extending in the circumferential direction with width and/or position matched according to the measurement are introduced into a section of the surface as engagement elements. This permits a relatively simple design of the transmission element and the eccentric cam parts. Such indentations offer a simple way to capture corresponding projections of the eccentric cam parts, and in addition are especially simple to adapt in position and width during the production process.

In an embodiment of the adjustment fitting, each of the eccentric cam parts has as a carrier element an arm extending radially beyond its circumference, and the transmission element has as an engagement element an overhang extending essentially axially with matched indentations, wherein the indentations capture the arms of the eccentric cam parts. In further advantageous embodiment, each of the eccentric cam parts has as an engagement element an arm extending axially, and the transmission element has as an engagement element an overhang extending essentially radially with matched indentations, wherein the indentations capture the arms of the eccentric cam parts. Depending on the desired design goal of the wobble mechanism, this means that either the transmission element is fabricated to be flat, i.e., extends essentially only in one plane, and the eccentric cam parts have an engagement element extending perpendicular to this plane, or alternatively the eccentric cam parts are fabricated to be flat while the transmission element has an engagement element extending perpendicular to this plane.

The advantages associated with the invention reside in particular in the fact that a minimal switchover clearance and the minimization of the loss angle at actuation of the wobble mechanism can be achieved by measuring the geometry of the eccentric cam parts and matching the geometry of the transmission element using the data from this measurement. Furthermore, a comparatively high strength and operational reliability of the adjustment mechanism can be attained, and uniform, synchronous start-up between adjustment fittings mounted on the right and left is achieved. In addition, costs and components are saved in the production process by avoiding parts selection at assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 illustrates the outer wheel and the inner wheel of a wobble mechanism, FIG. 5 illustrates the two eccentric cam parts, FIG. 6 illustrates the eccentric cam parts placed on the elongated collar with a transmission element for their actuation.

DETAILED DESCRIPTION

Like parts are labeled with the same reference numbers in all figures.

Figure 1:
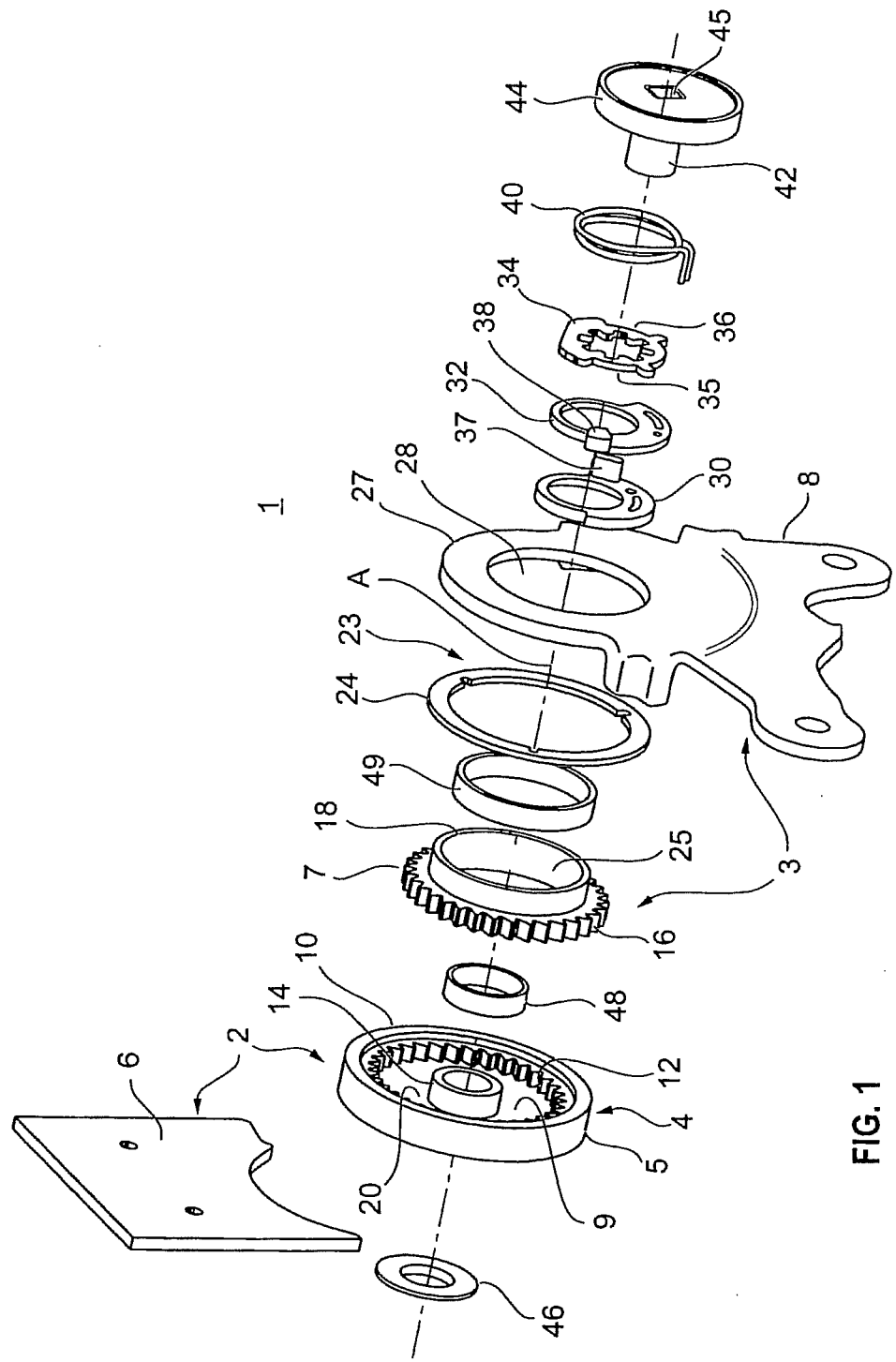
FIG. 1 is an exploded view of an adjustment fitting for a motor vehicle seat, wherein the outer wheel is designed as a ring gear in which the inner wheel is supported by means of a retaining element.

FIG. 1 shows an exploded view of an adjustment fitting 1 for a motor vehicle seat. The adjustment fitting 1 here includes a first fitting part 2 and a second fitting part 3, which are rotationally adjustable relative to one another about an axis of rotation A. The first fitting part 2 incudes an outer wheel 4, to which is attached, in particular by welding, a suitable backrest adapter 6 for later installation on a seat backrest. The second fitting part 3 includes an inner wheel 7 and a seat adapter 8 connected thereto for attachment to a seat base.

The outer wheel 4 is designed as a ring gear 5 with a floor 9 and a circumferential, cylindrical outer wall 10. Provided on the inside of the outer wall 10 are axially recessed internal teeth 12. The outer wall 10 is extended in the axial direction beyond the internal teeth 12. Also attached in the interior of the ring gear 5 is an elongated collar 14, which surrounds a central bore. Into the ring gear 5 is placed the inner wheel 7, which comprises circumferential external teeth 16 and a cylindrical inner wall 18 that is elongated in the axial direction beyond the external teeth 16.

To assemble the adjustment fitting 1, the inner wheel 7 is placed in the interior space 20 of the ring gear 4. Since the outside diameter of the inner wheel 7 has a reduced diameter as compared to the inside diameter 12 of the ring gear 4, the latter rotates in a wobbling manner with its external teeth 16 rolling on the internal teeth 12 in the ring gear 5. The number of teeth in the external teeth 16 is reduced as compared to the number of teeth in the internal teeth 12, so that in one full circuit the inner wheel 7 rotates relative to the ring gear 5 by the difference in tooth count.

The inner wheel 7 is inserted axially into the ring gear 5 down to the floor 9. A retaining element 23, which is designed as a retaining ring 24, is then guided into the interior space 20 of the ring gear 5 following the inner wheel 7, during which process it encloses the inner wall 18 of the inner wheel 7. The retaining ring 24 has a diameter that is slightly reduced relative to the inside diameter of the outer wall 10. Its inside diameter permits the wobbling motion of the enclosed inner wall 18 of the inserted inner wheel 7. The external teeth 16 of the inner wheel 7 are located on a circumferential flange by which the inner wheel 7 is supported against the retaining ring 24.

The retaining ring 24 is moved in an axial direction toward the floor 9 of the ring gear 5 until a defined axial play of the inner wheel 7 is established. This can take place under the control of either force or distance. In a force-controlled insertion, manufacturing tolerances in the axial width of the external teeth 16 are compensated. At the desired end position, the retaining ring 24 is circumferentially welded to the inner side of the outer wall 10.

As a result of the inner wheel 7 inserted into the ring gear 5, an eccentric receiving space 25 to accommodate a driving eccentric cam is formed between the elongated collar 14 and the inner wall 18.

The seat adapter 8 includes an outer ring 27, which overlaps the inner wall 18 of the inner wheel 7 via a central opening 28. In the assembled state, the inner wall 18 is permanently welded to the outer ring 27 of the seat adapter 8.

A first eccentric cam part 30 and a second eccentric cam part 32 are placed in the eccentric receiving space 25 to form a variable overall eccentricity. These two eccentric cam parts 30, 32, which together form the eccentric cam, are rotated relative to one another by means of a carrier plate 34 placed thereon, by which means their overall eccentricity is varied. To this end, the carrier plate 34 has lateral recesses 35, 36 in which the carrier projections 37, 38 of the first and second eccentric cam parts 30, 32 engage. The eccentric cam parts 30, 32 are preloaded by means of a spring element 40 to form a maximum overall eccentricity, wherein the inner wheel 7 is pressed against the outer wheel 4 without play in this position.

Provided for driving the adjustment fitting 1 is a continuous bearing journal 42, which includes an eccentric cover 44 that laterally engages the inner wall 18. A square opening 45 is introduced into the cover 44 for driving. The bearing journal 42 is joined to the carrier plate 34 in a rotationally fixed manner. To retain the bearing journal 42, a retaining ring 46 is provided on the opposite side.

An inner plain bushing 48 and an outer plain bushing 49 are provided in order to reduce the friction of the eccentric cam parts 30, 32 on the elongated collar 14 and on the inner wall 18. Here, the inner plain bushing 48 is placed on the elongated collar 14. The outer plain bushing 49 is placed in the inner wall 18.

When the bearing journal 42 is actuated, the two eccentric cam parts 30, 32 are moved in opposition to the spring force by the carrier plate 34, reducing the overall eccentricity. This results in play between the inner wheel 7 and the ring gear 5, so that the eccentric cam can be rotated with a wobbling rolling of the inner wheel 7 in the ring gear 5. The fitting parts 2, 3 are displaced relative to one another about the axis of rotation A.

Figure 2:
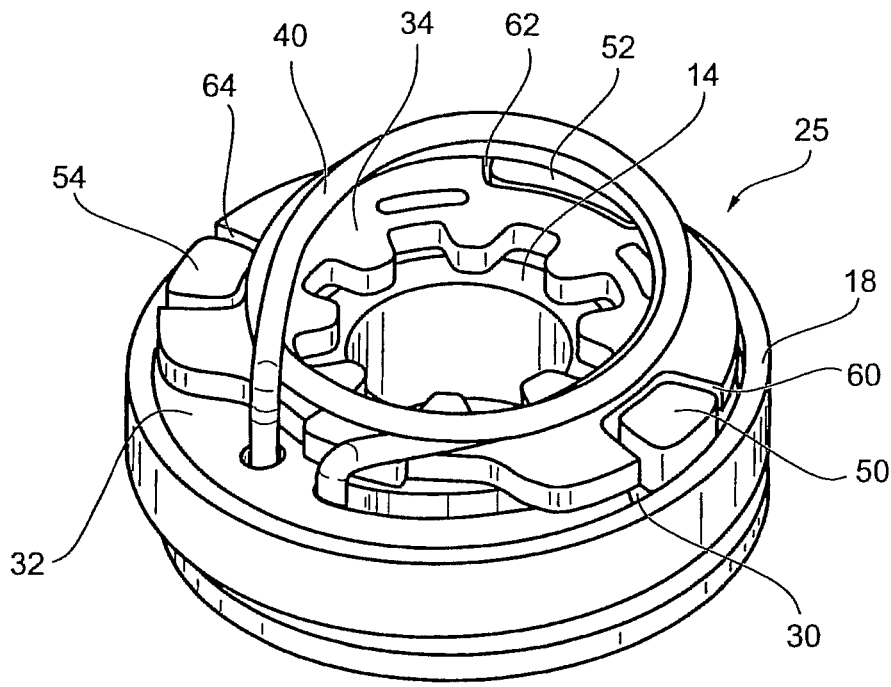
FIG. 2 is a detail view of the variable eccentricity of a wobble mechanism.

FIG. 2 shows the eccentric receiving space 25 with the elongated collar 14 and the inner wall 18 both being shown here. The inner wall 18 is attached to the inner wheel 7 (not shown in detail), which rotates in the outer wheel 4 that is permanently attached to the elongated collar 14. The eccentric receiving space 25 formed by the inner wall 18 with the elongated collar 14 is filled by two eccentric cam parts 30, 32, which are placed on the elongated collar 14. In this design, the eccentric cam parts 30, 32 have carrier elements 50, 52, 54, wherein the first eccentric cam part 30 has two carrier elements 50, 52, and the second eccentric cam part 32 has one carrier element 54. In the geometry shown, the carrier elements 50, 52, 54 are designed as pins that stand perpendicularly from the plane of the eccentric cam parts and are captured by corresponding engagement elements 60, 62, 64 of the carrier plate 34, which functions as a transmission.

The eccentric cam parts 30, 32 are preloaded against one another by a spring element 40, so that in the rest state, i.e., when no force acts on the carrier plate 34, the eccentricity formed by the eccentric cam parts 30, 32 is maximized and the eccentric receiving space 25 between the elongated collar 14 and the inner wall 18 is maximally filled, so that the eccentric cam parts 30, 32 lie therein without play. When a force acts on the carrier plate 34, the eccentric cam parts 30, 32 are rotated relative to one another against the force of the spring element 40, and the eccentricity reduces as a result of the altered adjustment angle, so that the wobble mechanism can be actuated.

Figure 3:
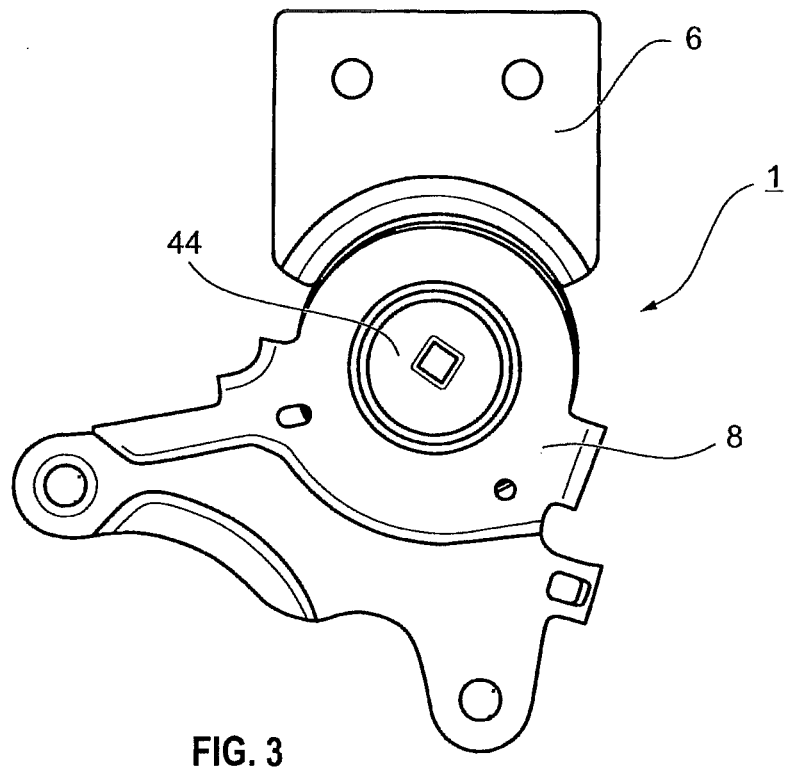
FIG. 3 illustrates the fully assembled adjustment fitting with two fitting parts from FIG. 1.

FIG. 3 shows an adjustment fitting 1 for a vehicle seat with the backrest adapter 6 and the seat adapter 8, which are provided for attachment to the seat surface and backrest of a vehicle seat. Of the wobble mechanism connecting them, only the cover 44 is visible.

FIG. 4 shows the outer wheel 4 with internal teeth 12, as well as the inner wheel 7, with external teeth 16 and inner wall 18, that rotates therein. In this design, the outer wheel 4 is attached to the elongated collar 14. The inner wheel 7 has a smaller number of teeth than the outer wheel 4, by which means a suitable transmission ratio of the wobble mechanism is implemented.

FIG. 5 shows the first eccentric cam part 30 and the second eccentric cam part 32 separately. The carrier elements 50, 52 on the first eccentric cam part 30 and the carrier element 54 on the second eccentric cam part 32 are clearly visible here. The eccentric cam parts 30, 32 also have holes 70 for accommodating the spring element 40.

FIG. 6 again shows the eccentric receiving space 25 from FIG. 2, in this case without the spring element 40 for ease of recognition. The engagement with the carrier plate 34 by the engagement elements 60, 62, 64 in combination with the carrier elements 50, 52, 54 on the eccentric cam parts 30, 32 is clearly visible here.

As a result of manufacturing tolerances, in particular of the eccentric cam parts 30, 32 and the position of the carrier elements 50, 52, 54, the angle of rotation of the eccentric cam parts 30, 32 relative to one another may vary. For this reason, the angle of rotation of the eccentric cam parts 30, 32 relative to one another is measured during the production process, and the geometry of the carrier plate 34, here in particular its engagement elements 60, 62, 64, is appropriately matched in order to achieve an angle of rotation of the eccentric cam parts 30, 32 relative to one another that is consistent throughout production.

Figure 7:
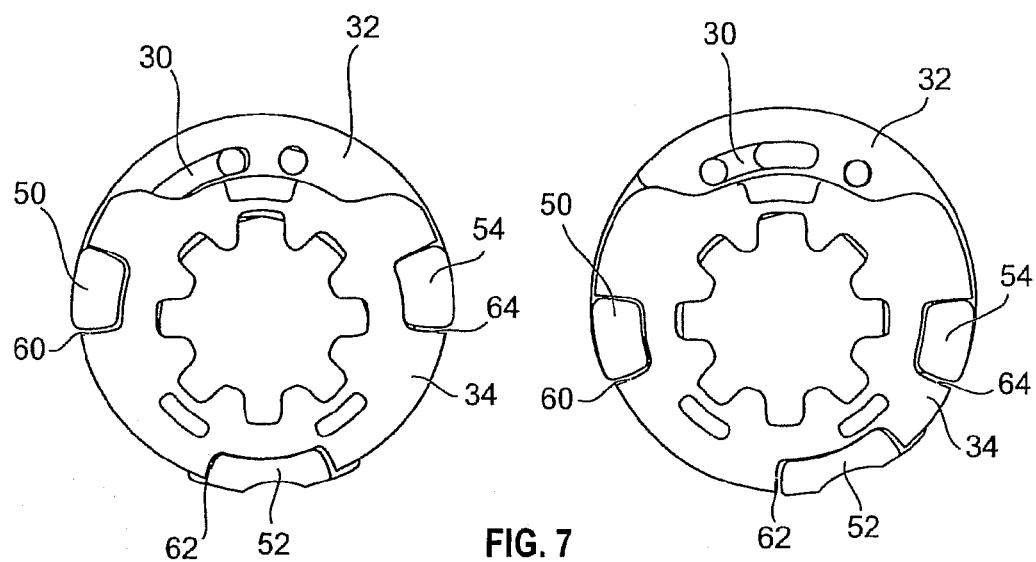
FIG. 7 illustrates pairs of eccentric cam parts with a transmission element in different geometries with planar design of the transmission element.

FIG. 7 shows pairs of eccentric cam parts 30, 32 and a carrier plate 34. Here, the position of the engagement elements 60, 62, 64 is matched to the respective deviations in the geometry of the carrier elements 50, 52, 54 of the eccentric cam parts 30, 32 differently for each of the two carrier plates 34. Because of the matching of the engagement elements 60, 62, 64 of the carrier plate 34, a constant maximum angle of rotation can be achieved in the two devices shown in FIG. 7 despite the manufacturing tolerances in the geometry of the eccentric cam parts 30, 32. The embodiment shown in FIG. 7 shows a planar carrier plate 34, while the carrier elements 50, 52, 54 of the eccentric cam parts 30, 32 stand perpendicularly from the plane of the carrier plate 34.

Figure 8:
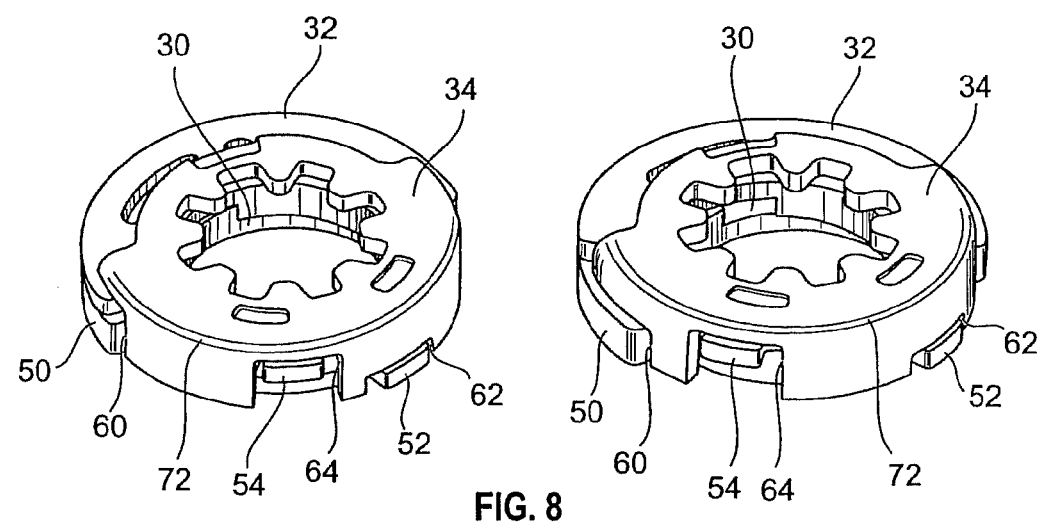
FIG. 8 illustrates pairs of eccentric cam parts with a transmission element in different geometries, here with planar construction of the eccentric cam.

FIG. 8 shows an alternative embodiment in which the eccentric cam parts 30, 32 are of planar design and the carrier elements 50, 52, 54 extend essentially radially outward, while the carrier plate 34 has an edge 72 that is perpendicular to the plane of the eccentric cam parts and has the engagement elements 60, 62, 64 that stand in engagement with the carrier elements 50, 52, 54. In this embodiment, too, the angles of rotation for the two devices shown in FIG. 7 can be matched in that the geometry of the eccentric cam parts 30, 32 is measured during the production process, and the location and width of the engagement elements 60, 62, 64 of the carrier plate 34 is appropriately matched.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing an adjustment fitting for a motor vehicle seat having an outer wheel with internal teeth that are associated with a first fitting part, and having an inner wheel with external teeth that are associated with a second fitting part, the method comprising:
    inserting the inner wheel with the external teeth eccentrically to an axis of rotation, in the manner of a wobble mechanism, in the outer wheel with the internal teeth,
    placing eccentric cam parts that form a variable eccentricity such that the eccentric cam parts are rotatable with respect to one another in an eccentric receiving space formed between the axis of rotation and the inner wheel; and
    providing a transmission element having engagement elements, the transmission element being configured to actuate the eccentric cam parts and is employed such that the engagement elements work together with carrier elements of the eccentric cam parts,
    wherein a measurement of the geometry of the inserted eccentric cam parts is made after said placing the eccentric cam parts and the geometry of the transmission element is individually matched based on the measurement data before insertion of the transmission element, said measurement of the geometry of the inserted eccentric cam part comprising an angle of rotation of the eccentric cam parts relative to one another.

2. The method according to claim 1, wherein the geometric position and length of the engagement elements is matched.

3. The method according to claim 1, wherein indentations extending in the circumferential direction with a width or position that is matched according to the measurement are introduced into a section of the surface in the transmission element as engagement elements.

4. An adjustment fitting manufactured in accordance with the method according to claim 1.

5. The adjustment fitting according to claim 4, wherein each of the eccentric cam parts has, as carrier elements, an arm extending essentially radially, and the transmission element has, as engagement elements, matched indentations in an overhang extending essentially axially, and wherein the indentations capture the arms of the eccentric cam parts.

6. The adjustment fitting according to claim 4, wherein each of the eccentric cam parts have, as engagement elements, an arm extending axially, and the transmission element has, as engagement elements, matched indentations in an overhang extending essentially radially, and wherein the indentations capture the arms of the eccentric cam parts.

7. A method for manufacturing an adjustment fitting for a motor vehicle seat having an outer wheel with internal teeth that are associated with a first fitting part, and having an inner wheel with external teeth that are associated with a second fitting part, the method comprising:
    inserting the inner wheel with the external teeth eccentrically to an axis of rotation, in the manner of a wobble mechanism, in the outer wheel with the internal teeth,
    placing eccentric cam parts that form a variable eccentricity such that the eccentric cam parts are rotatable with respect to one another in an eccentric receiving space formed between the axis of rotation and the inner wheel;
    providing a transmission element having engagement elements, the transmission element being configured to actuate the eccentric cam parts and is employed such that the engagement elements work together with carrier elements of the eccentric cam parts;
    measuring, during the production process, the geometric parameters of the eccentric cam parts; and
    individually matching the geometry of the transmission element based on the measured geometric parameters before insertion of the transmission element,
    wherein said geometric parameters comprise an angle of rotation of the eccentric cam parts relative to one another.

8. The adjustment fitting according to claim 5, wherein a position of the engagement elements is matched to respective deviations in a geometry of the carrier elements.

9. The adjustment fitting according to claim 5, wherein a position of the engagement elements is matched to respective deviations in a geometry of the carrier elements individually.

* * * * *